United States Patent
Yu et al.

[11] Patent Number: 5,952,120
[45] Date of Patent: Sep. 14, 1999

[54] METHOD OF MAKING A TRILAYER BATTERY SEPARATOR

[75] Inventors: Wei-Ching Yu, Charlotte; Shawn E. Hux, Gastonia, both of N.C.

[73] Assignee: Celgard LLC, Charlotte, N.C.

[21] Appl. No.: 08/839,664

[22] Filed: Apr. 15, 1997

[51] Int. Cl.⁶ .................................................. H01M 2/14
[52] U.S. Cl. ................... 429/144; 29/623.4; 264/171.11; 264/175; 264/288.4
[58] Field of Search ..................... 429/144, 247; 29/623.1, 623.4; 264/171.1, 173.11, 175, 288.4, 291

[56] References Cited

U.S. PATENT DOCUMENTS

| | | | |
|---|---|---|---|
| 4,650,730 | 3/1987 | Lundquist et al. | 429/62 |
| 4,731,304 | 3/1988 | Lundquist et al. | 429/62 |
| 5,240,655 | 8/1993 | Troffkin et al. | 429/254 X |
| 5,281,491 | 1/1994 | Rein et al. | 429/145 X |
| 5,691,077 | 11/1997 | Yu | 429/62 |

FOREIGN PATENT DOCUMENTS

| | | |
|---|---|---|
| 6-98394 | 5/1994 | Japan . |
| 6-98395 | 5/1994 | Japan . |
| 5-56320 | 3/1995 | Japan . |
| 2298 817 | 9/1996 | United Kingdom . |

*Primary Examiner*—Steven J. Kalafut
*Attorney, Agent, or Firm*—Robert H. Hammer III

[57] ABSTRACT

A method of making a trilayer, shutdown battery separator has the following steps: extruding a polyethylene precursor; extruding a polypropylene precursor; forming a trilayer precursor, the trilayer precursor having the polyethylene precursor sandwiched between two polypropylene precursors; bonding the trilayer precursor; annealing the trilayer precursor; stretching the trilayer precursor; and forming thereby the battery separator.

14 Claims, 2 Drawing Sheets

METHOD OF MAKING A TRILAYER BATTERY SEPARATOR

FIELD OF THE INVENTION

The invention is directed to a method of making a trilayer, shutdown battery separator.

BACKGROUND OF THE INVENTION

Trilayer, shutdown battery separators are known. See: Japanese Patent Application Nos. 98395/1994 and 98394/1994 both filed May 20, 1994 by Ube Industries, Ltd. (the Ube trilayer separator); U.S. patent application Ser. No. 359,772 filed Dec. 20, 1994, now abandoned, by Hoechst Celanese Corporation (the CELGARD® Separator); Japanese Patent Application No. 55550/1995 filed Mar. 15, 1995 by Nitto Denko Kogyo K.K. (the Nitto Denko trilayer separator); and Japanese Patent Application No. 56320/1995 filed Mar. 15, 1995 by Kureha Chemical Industry Co., Ltd. (the Kureha trilayer separator).

Trilayer, shutdown battery separator are porous films and have become a commercial success, within the battery industry, particularly within the secondary (or rechargeable) lithium battery industry. The success is believed to be due, in part, to the separator's puncture strength and the separator's ability to reduce the risk of internal short circuit within the battery. The separator's puncture strength is, at least, important because it enables the separator to withstand the rigors of battery manufacture. The separator's ability to reduce the risk of internal short circuit is believed to be important because internal short circuit may lead to unexpected battery rupture.

The Ube trilayer separator is a porous trilayer film having a polypropylene-polyethylene-polypropylene construction. Ube's process includes the steps of: extruding a polypropylene non-porous precursor; extruding a polyethylene non-porous precursor; forming the polypropylene-polyethylene-polypropylene non-porous trilayer precursor; bonding the trilayer precursor together at a temperature ranging from 120–140° C. between nip rollers and then taking up the precursor for subsequent processing; heat-treating (annealing) the bonded precursor at a temperature range from 110–140° C.; and stretching the bonded, annealed precursor to form the porous, trilayer separator. The stretching step consisted of three discrete steps: cold-stretching (temperature ranging from −20° to 50° C. and a draw ratio of 5–200%); hot-stretching (temperature ranging from 70–130° C. and a draw ratio of 100–400%); and heat-treating, also believed to be referred to as annealing and/or relax (temperature ranging from 75–175° C. and a draft ratio of −10 to −50% or 0%).

The CELGARD® separator is a porous trilayer film having a polypropylene-polyethylene-polypropylene construction. The CELGARD separator process includes the steps of: forming a porous polypropylene precursor; forming a porous polyethylene precursor; forming a porous trilayer precursor; and bonding the porous trilayer precursor to form the trilayer battery separator.

The Nitto Denko separator is a porous trilayer film having polypropylene-polyethylene-polypropylene construction. The Nitto Denko separator process includes the steps of: co-extruding a trilayer precursor having a polypropylene-polyethylene-polypropylene non-porous construction; annealing (heat-treating) the trilayer precursor; and stretching the annealed trilayer precursor to form the porous trilayer battery separator.

The Kureha separator is a porous trilayer film having a polypropylene-polyethylene-polypropylene construction. The Kureha separator process includes the steps of: co-extruding a trilayer precursor, the precursor containing a pore forming aid (e.g., a fine inorganic particle or a solvent extractable material); and forming the pores in the precursor by stretching the particle-loaded precursor or by solvent extraction of the extractable-laden precursor.

There is a need to continue to improve the process for making trilayer shutdown separators so that: manufacturing throughput can be increased while minimizing the capital investment; and manufacturing cost can be minimized by minimizing material handling costs and increasing production quality.

SUMMARY OF THE INVENTION

A method of making a porous, trilayer, shutdown battery separator has the following steps: extruding a non-porous polyethylene precursor; extruding a non-porous polypropylene precursor; forming a non-porous trilayer precursor, the trilayer precursor having the polyethylene precursor sandwiched between two polypropylene precursors; simultaneously bonding and annealing the trilayer precursor to form a bonded and annealed trilayer precursor; stretching the bonded and annealed trilayer precursor; and forming thereby the porous battery separator.

A method of making a trilayer, shutdown battery separator has the following steps: extruding a non-porous polyethylene precursor; extruding a non-porous polypropylene precursor; forming a non-porous trilayer precursor, the trilayer precursor having the polyethylene precursor sandwiched between two polypropylene precursors; bonding the trilayer precursor to form a bonded precursor; annealing the bonded precursor; and stretching the bonded, annealed precursor to form the battery separator. The annealing step further includes annealing in two zones, each zone at a different temperature.

DESCRIPTION OF THE DRAWINGS

For the purpose of explaining the invention, there is shown in the drawings various preferred aspects of the invention; it being understood, however, that this invention is not limited to the precise arrangements and instrumentalities shown.

DETAILED DESCRIPTION OF THE INVENTION

A trilayer, shutdown battery separator refers to a porous film for use in electrochemical cells, e.g., batteries, particularly secondary (or rechargeable) batteries, such as lithium batteries. This trilayer separator has a polypropylene-polyethylene-polypropylene construction. The separator has a thickness of less than 3 mils (about 75 microns). The separator's thickness preferably ranges between 0.5 mils (about 12 microns) and 1.5 mils (about 38 microns). Most preferably, the separator's thickness is about 1 mil (about 25 microns). Preferably, the separator has a permeability, as measured by Gurley, of less than 50 sec. Preferably, the separator has a puncture strength of at least 300 grams. Preferably, the separator has an interply adhesion strength of at least 5 grams/inch. The separator's pores have an average area in the range of 0.003 to 0.010 square microns with an aspect ratio ranging from 3 to 5.

The method of making the trilayer, shutdown battery separator generally comprises the steps of: extruding a non-porous polypropylene precursor; extruding a non-porous polyethylene precursor; forming a non-porous trilayer precursor where the polyethylene precursor is sandwiched between the polypropylene precursors; bonding the trilayer precursor; annealing the trilayer precursor; and stretching the bonded and annealed, non-porous trilayer precursor to form the porous battery separator. Each of the steps shall be discussed in greater detail below.

Extruding the polypropylene or a polyethylene precursor refers to the conversion of resin into a non-porous film. Extrusion is performed in a conventional manner, preferably through a circular dye, so that the parison may be collapsed for subsequent processing (e.g. to form a 2-ply structure). Varying the precursor thickness, to obtain the desired final separator thickness, is well known. Polypropylene refers to polypropylene, or a blend comprising primarily polypropylene, or a copolymer of polypropylene. An exemplary polypropylene is Escorene PP 4292 commercially available from Exxon Chemical Company, Houston, Tex. Polyethylene refers to polyethylene, or a blend comprising primarily polyethylene, or a copolymer of polyethylene. An exemplary polyethylene is Fina HDPE 7208 commercially available from Fina Oil and Chemical Company, Dallas, Tex., and Hizex HDPE 5202B commercially available from Mitsui Petrochemical Industries, Ltd.

Figure 1:
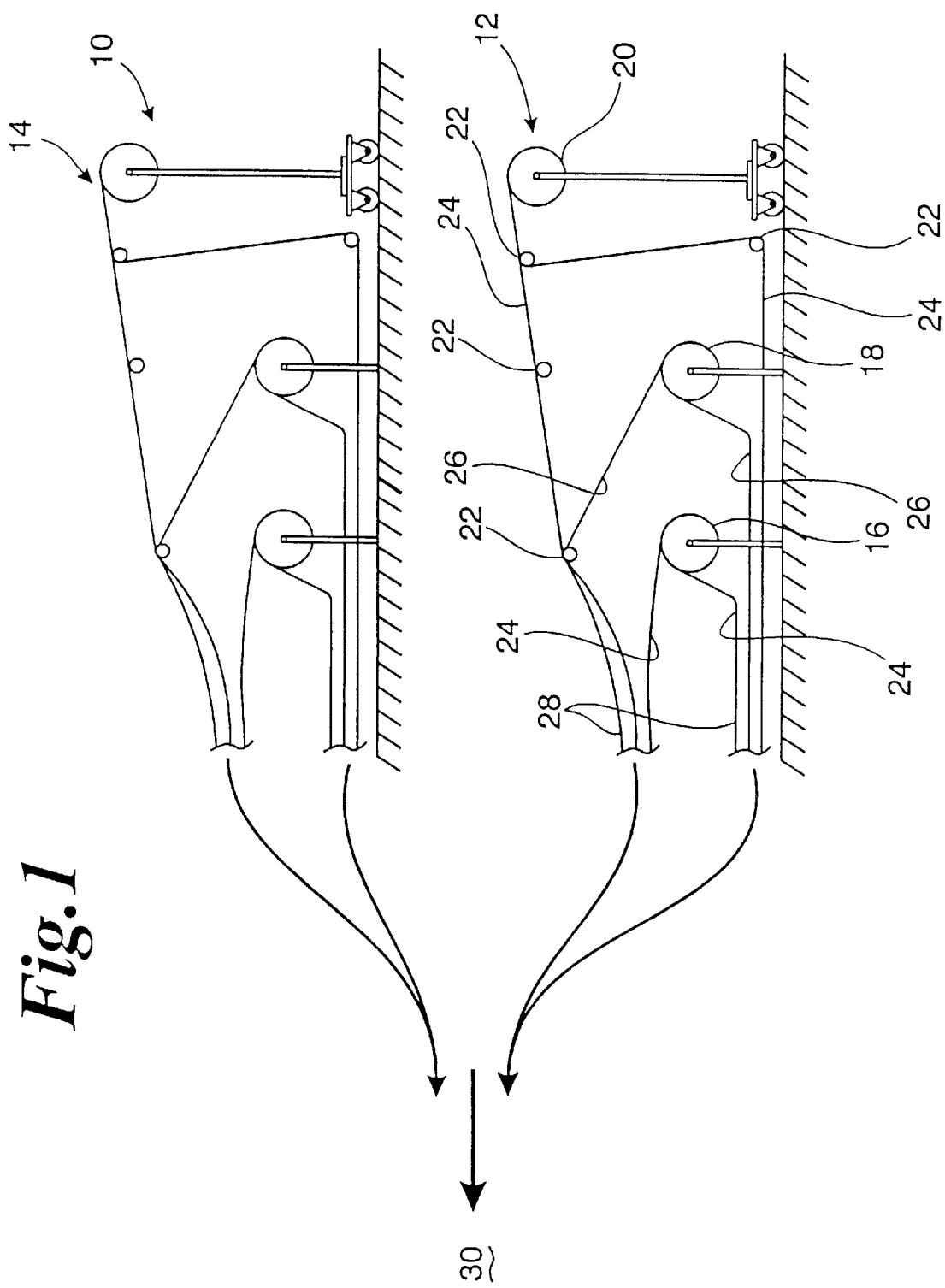
FIG. 1 is a schematic illustration of trilayer precursor formation set-up.

Forming the trilayer precursor may be accomplished as shown in FIG. 1. Scheme 10 includes a first level layout 12 and a second level layout 14. Layouts 12 and 14 are identical, but for elevation (to efficiently use space), so only layout 12 will be discussed in detail. Layout 12 comprises three unwind stations 16, 18, and 20. Stations 16 and 20 support rolls of polypropylene precursor (i.e., one roll—2 plies), and station 18 supports a roll of polyethylene precursor (i.e., one roll—2 plies). To avoid wrinkling or creasing, these precursors are handled (as much as possible), in 2-ply form. The polypropylene precursors 24 and polyethylene precursor 26 are unwound from their rollers, deplyed, in some cases with the assistance of guide rollers 22, and then replied to form trilayer precursors 28. From scheme 10, four (4) trilayer precursors 28 are formed. ). A minimum of at least two trilayer precursors is preferred for process economics. At least four trilayer precursors are preferred so to avoid the wrinkle problem and to more efficiently use equipment (economic reasons to facilitate production efficiency, at least four trilayer precursors are (and preferably eight or more) simultaneously passed through the following steps of bonding, annealing and stretching. The precursors 28 are forwarded to the next processing operation (not shown).

Bonding and annealing of the trilayer precursor may be performed in a multizone oven 40, each zone capable of maintaining a distinct temperature. See, for example, FIGS. 2–3. Bonding is for joining together the polypropylene-polyethylene-polypropylene precursors to form the trilayer precursor. The interply adhesion should be at least 5 gram/inch. Bonding may be performed at a temperature ranging from 125–135° C. and between nip rollers. Preferably, bonding is performed at a temperature ranging from 128–130° C. Annealing is to form crystal structures in the polymers to facilitate pore formation in the stretching step. Annealing is influenced by temperature and time. Accordingly, the multizoned oven capable of maintaining several distinct temperatures may be advantageous. Annealing of the trilayer precursor should be conducted within the temperature range of 105–135° C., preferably in the range of 110–130° C. If annealing is conducted at a single temperature, that temperature should be in the range of 125–132° C., preferably about 128° C. If annealing is conducted at more than a single temperature, e.g., to separately influence annealing in the differing polymer layers, then the higher temperature, e.g., the temperature influencing the polypropylene, should be in the range of 125–132° C., preferably 128–132° C.; and the lower temperature, e.g., the temperature influencing the polyethylene, should be in the range of 105–125° C., preferably about 110° C.

Stretching the bonded and annealed trilayer precursor forms the microporous structure of battery separators. Stretching generally includes several steps, e.g., a cold drawing step, a hot drawing step, and a relax or heat-treating step. The relax or heat-treating step is to reduce internal stress within the separator and may be accomplished with either negative draw ratio or substantially no draw tension at various heat profiles. Stretching is a continuous process performed in ovens containing a draw frame.

The cold drawing step is conduced at ambient temperature (i.e., no energy is input into the precursor) and at a draw ratio in the range of 15–40%. Preferably the draw ratio is in the rang of 20–35%.

The hot drawing step is conduced at temperatures ranging from 110–125° C. and at draw ratios ranging from 105–130%. Preferably, hot drawing is conducted at temperatures ranging from 115–123° C. and at draw ratios ranging from 110–125%.

The relax or heat-treating step is conducted at temperatures ranging from 110–125° C. and at draw ratios ranging from −30 to −50%. Preferably, relax or heat-treatment is conducted at temperatures ranging from 115–123° C. and at draw ratios of −30 to −50%.

After stretching, the trilayer battery separators are wound up and slit to desired widths.

The invention is further illustrated with reference to the following examples:
Test Methods
Gurley ASTM-D726(B)

Gurley is a resistance to air flow measured by the Gurley Densometer (e.g. Model 4120). Gurley is the time in seconds required to pass 10 cc of air through one square inch of product under a pressure of 12.2 inches of water.
Thickness Method: T411 om-83 developed under the auspices of the Technical Association of the Pulp and Paper Industry. Thickness is determined using a precision micrometer with a ½ inch diameter, circular shoe contacting the sample at seven (7) PSI. Ten (10) individual micrometer readings taken across the width of the sample are averaged.
Porosity ASTM D-2873
Puncture Strength Ten measurements are made across the width of the stretched product and averaged. A Mitech Stevens LFRA Texture Analyzer is used. The needle is 1.65 mm in diameter with 0.5 mm radius. The rate of descent is 2 mm/sec and the amount of deflection is 6 mm. The film is held tight in the clamping device with a central hole of 11.3 mm. The displacement (in mm) of the film that was pierced by the needle was recorded against the resistance force (in gram force) developed by the tested film. The maximum resistance force is the puncture strength.
Peel Strength Peel strength is measured using a tension and compression tester to determine the force in grams required to separate two one-inch wide sections of bonded membrane. The peel rate is 6 inches/minute. Three measurements are taken across the web and averaged.
Shrinkage The sample in the machine direction is marked $L_i$ ($L_i$= 9.99 cm) apart, and then suspended in a convection oven set at 90° C. for one hour. After taking out of the oven, the sample is then measured the distance, $L_f$, between the marks. The shrinkage is calculated as follows.

$(\%)\text{ Shrinkage}=(L_i-L_f)\times 100/L_f$

EXAMPLE 1

The polyethylene precursor was extruded from Fina HDPE 7208 resin to form a 0.38 micron thick film. The polypropylene precursor was extruded from Escorene PP 4292 to form a 0.37 micron thick film. The trilayer precursor was formed as shown in FIG. 1.

Figure 2:
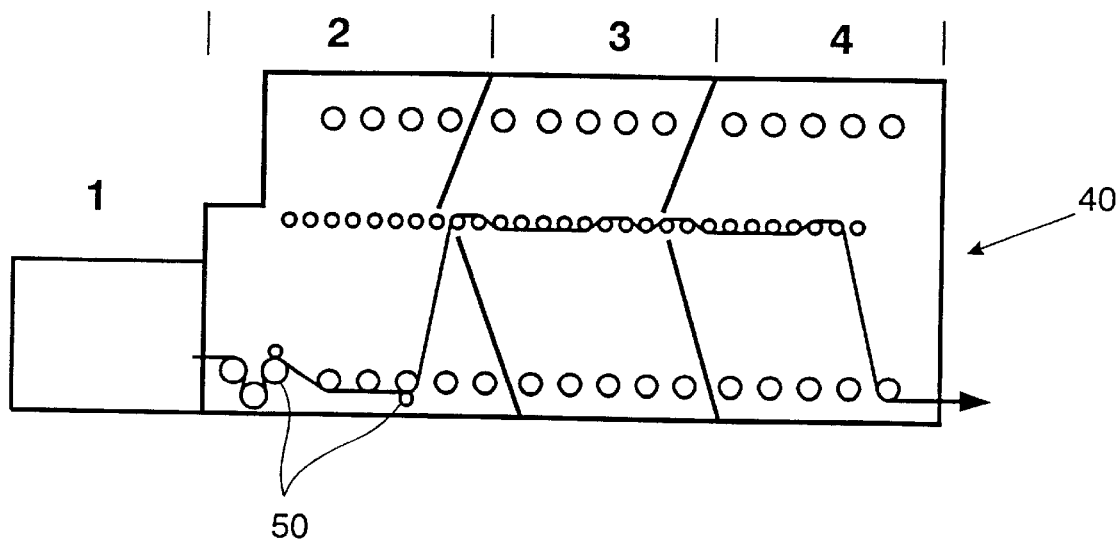
FIG. 2 is a schematic illustration of a bonding/annealing string-up configuration.

The bonding and annealing of the precursor was accomplished as follows: the precursor was strung-up with the oven configured as shown in FIG. 2; the oven has 4 zones. The nip rollers 50 are located in zone 2. Zones 2, 3 and 4 were set at a temperature of 128° C. and the line speed was 30 ft./min. The adhesion of the trilayer precursor was 5.7 g/in. The trilayer precursor was then stretched under various conditions (note Table 1) to yield the battery separator, the results are set in Table 1.

Figure 3:
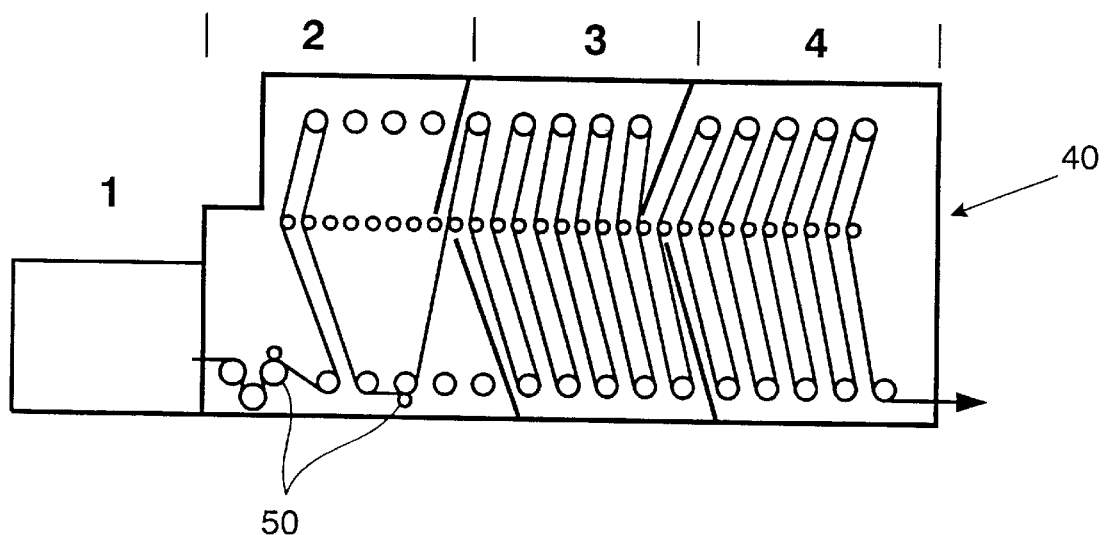
FIG. 3 is a schematic illustration of another bonding/annealing string-up configuration.

The bonding and annealing of the precursor was accomplished as follows: the precursor was strung-up with the oven configured as shown in FIG. 3. Zone 1 is at ambient temperature, zone 2 at 128–130° C., and zones 3 and 4 at 110° C. The line speed was 40 ft./min. The interply adhesion for the precursor was greater than 30 g/in. The trilayer precursors were then stretched under various conditions (note Table 2) and at speeds ranging from 20–30 ft/min. (feed speed) to 40–60 ft/min. (output speed) to yield the battery separator; the results are set forth in Table 2.

TABLE 1

| Sample | Oven Temp (° C.) | Cold Stretch (%) | Hot Stretch (%) | Relax (−%) | Gurley (Sec) | Thickness (mil) | Punct. Strength (g) | Shrinkage (%) |
|---|---|---|---|---|---|---|---|---|
| 1 | 115 | 35 | 115 | 50 | 32.9 | 1.02 | 388 | 25.5 |
| 2 | 120 | 35 | 115 | 50 | 29.3 | 1.02 | 396 | 15.3 |
| 3 | 120 | 30 | 115 | 45 | 28.3 | 0.97 | 400 | 17.3 |
| 4 | 120 | 25 | 115 | 40 | 29.5 | 0.99 | 421 | 18 |
| 5 | 120 | 25 | 115 | 35 | 100+ | — | — | — |
| 6 | 120 | 30 | 115 | 40 | 66 | .99 | 435 | 2.6 |
| 7 | 120 | 35 | 115 | 45 | 50 | .95 | 428 | 3.0 |
| 8 | 120 | 35 | 115 | 30 | 40 | .98 | 442 | 7.0 |
| 9 | 120 | 25 | 125 | 30 | 162 | .94 | 441 | 7.0 |
| 10 | 118 | 35 | 115 | 30 | 22 | 1.01 | 439 | 13.0 |

TABLE 2

| Sample | Oven Temp (° C.) 2 | 3 | 4 | Cold Stretch (%) | Hot Stretch (%) | Relax (−%) | Gurley (Sec) | Thickness (mil) | Shrinkage (%) |
|---|---|---|---|---|---|---|---|---|---|
| 4 | 118 | 118 | 118 | 35 | 115 | 50 | 28.8 | 1.00 | 10.0 |
| 6 | 118 | 118 | 128 | 35 | 115 | 50 | 31.6 | 1.00 | 3.0 |
| 7 | 118 | 118 | 123 | 35 | 115 | 50 | 28.9 | 1.00 | 6.0 |
| 8 | 118 | 118 | 123 | 30 | 120 | 50 | 31.8 | 1.00 | 7.0 |
| 9 | 118 | 118 | 123 | 25 | 115 | 40 | 26.6 | 1.00 | 5.0 |
| 10 | 118 | 118 | 123 | 20 | 120 | 40 | 25.4 | 1.00 | 5.0 |
| 101 | 118 | 118 | 123 | 20 | 120 | 40 | 25.4 | 1.00 | 3.0 |
| 102 | 118 | 118 | 123 | 20 | 120 | 40 | 24.6 | 1.02 | 3.1 |
| 11 | 118 | 118 | 123 | 20 | 110 | 30 | 25.8 | 1.02 | 5.6 |
| 12 | 118 | 118 | 123 | 20 | 110 | 30 | 27.0 | 1.02 | 6.9 |
| 13 | 123 | 123 | 123 | 20 | 120 | 40 | 24.0 | 0.99 | 2.2 |
| 14 | 123 | 123 | 123 | 20 | 120 | 40 | 25.4 | 1.01 | 3.5 |

EXAMPLE 2

The polyethylene precursor was extruded from Fina HDPE 7208 resin to form a 0.38 micron film. The polypropylene precursor was extruded from Escorene PP 4292 to form a 0.37 micron film. The trilayer precursor was formed as shown in FIG. 1.

EXAMPLE 3

The polyethylene precursor was extruded from Hizex HDPE 5202 B resin to form a 0.65 micron film. Otherwise, the procedures of Example 2 were followed except as noted in Table 3.

TABLE 3

The polyethylene precursor was extruded from Hizex HDPE 5202 B resin to form a 0.65 micro film. Otherwise, the procedures of Example 2 were followed except as noted in Table 3.

| Sample | Oven Temp (° C.) | Hot Stretch (%) | Cold Stretch (%) | Relax– (–%) | Gurley (Sec) | Thickness (mil) | Shrinkage (%) |
| --- | --- | --- | --- | --- | --- | --- | --- |
| 1 | 118 | 35 | 115 | 40 | 31.6 | 1.24 | 10 |
| 2 | 118 | 35 | 115 | 50 | 33.8 | 1.24 | 7.4 |

We claim:

1. A method of making a trilayer, shutdown battery separator comprising the steps of:

extruding a polyethylene precursor;

extruding a polypropylene precursor;

forming a nonporous trilayer precursor, the trilayer precursor having the polyethylene precursor sandwiched between two polypropylene precursor;

simultaneously bonding and annealing the trilayer precursor to form a bonded and annealed trilayer precursor, the annealing being preformed at temperatures ranging from 105 to 135° C., and the annealing further comprising two zones, each zone at a different temperature;

stretching the bonded and annealed trilayer precursor; and forming thereby the battery separator.

2. The method according to claim 1 where bonding is performed at a temperature ranging from 125 to 135° C.

3. The method according to claim 1 where bonding is performed by nip rollers.

4. The method according to claim 1 where stretching is performed in several steps.

5. The battery made with the separator produced by the method of claim 1.

6. A method of making a trilayer, shutdown battery separator comprising the steps of:

extruding a polyethylene precursor;

extruding a polypropylene precursor;

forming a nonporous trilayer precursor, the trilayer precursor having the polyethylene precursor sandwiched between two polypropylene precursors;

bonding the trilayer precursor, to form a bonded trilayer precursor;

annealing the bonded trilayer precursor, to form a bonded, annealed trilayer precursor, the annealing being performed at temperatures ranging from 105° to 135° C., and further comprising two zones, each zone at a different temperature within the range;

stretching the bonded, annealed trilayer precursor; and forming thereby the battery separator.

7. The method according to claim 6 where bonding is performed at a temperature ranging from 125 to 135° C.

8. The method according to claim 6 whereby bonding is performed by nip rollers.

9. The method according to claim 8 where bonding and annealing are initiated simultaneously.

10. The method according to claim 6 where stretching is performed in several steps.

11. The battery made with the separator produced by the method of claim 6.

12. A method of making a trilayer, shutdown battery separator comprising the steps of:

extruding a polyethylene precursor;

extruding a polypropylene precursor;

forming a nonporous trilayer precursor, the trilayer precursor having the polyethylene precursor sandwiched between two polypropylene precursors;

bonding, annealing and stretching the trilayer precursor in a multizone oven, the annealing being performed at temperatures ranging from 105° to 135° C. and further comprising two zones, each zone at a different temperature; and forming thereby the battery separator.

13. A method of making a trilayer, shutdown battery separator comprising the steps of:

providing a nonporous trilayer precursor, the trilayer precursor having a polyethylene layer sandwiched between two polypropylene layers;

annealing the trilayer precursor, to form an annealed trilayer precursor, the annealing being performed at temperatures ranging from 105° to 135° C., and further comprising two zones, each zone at a different temperature within the range;

stretching the annealed trilayer precursor; and forming thereby the battery separator.

14. A method of making a trilayer, shutdown battery separator comprising the steps of:

providing a nonporous trilayer precursor, the trilayer precursor having a polyethylene layer sandwiched between two polypropylene layers;

annealing and stretching the trilayer precursor in a multizone oven, the annealing being performed at temperatures ranging from 105° to 135° C. and further comprising two zones, each zone at a different temperature; and forming thereby the battery separator.

* * * * *